UNITED STATES PATENT OFFICE 2,585,580

STABILIZING ASCORBIC ACID WITH THIO-SUGARS

Jan Opplt, Prague-Nusle, Czechoslovakia

No Drawing. Application June 10, 1948, Serial No. 32,258. In Czechoslovakia June 12, 1947

8 Claims. (Cl. 260—344.5)

The present invention relates to stabilizing ascorbic acid with thio-sugars.

The ascorbic acid represents a necessary constituent of human food and therefore it is of importance to protect the same in the various natural and artificially prepared products against decomposition by suitable stabilization. The ascorbic acid, which occurs in the nature as the so called vitamin C, is a relatively unstable substance easily oxidizable by the atmospheric air into dehydro-ascorbic acid, which also is unstable, and to further products of oxidation whereby the physiological value of ascorbic acid as an antiscorbutic agent is lost. The l-ascorbic acid $C_6H_8O_6$ has the following constitution:

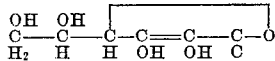

The ascorbic acid is a compound allied to the simple sugars having six carbon atoms in their molecule and is characterized by a lactonic ring and by an endiol group —COH=COH—. This group accounts for the easy oxidation of ascorbic acid to dehydro-ascorbic acid $C_6H_6O_6$ having the constitution:

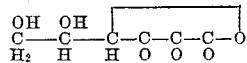

The last mentioned acid is also unstable, and by splitting of the lactonic ring is converted into 2,3-diketo-l-gulonic acid:

$CH_2OH—CHOH—CHOH—CO—CO—COOH$

The dehydro-ascorbic acid still may be reduced into ascorbic acid with relative facility also in living organisms and has antiscorbutic effect, but the product of further oxidation cannot be easily converted into ascorbic acid and in any case such a reduction cannot take place in a living organism so that the product is physiologically inefficient.

Ascorbic acid is contained in relatively large proportions in various natural foods, in fresh condition of the same, such as fruit, vegetables, meat, more particularly in the muscles and liver of animals and in products made therefrom (such as fruit marmalades and preserves of various kinds, meat or liver extracts and the like). Synthetically prepared ascorbic acid forms a component of various medicaments, preparations and injection liquids. In all the aforementioned products it is desirable to stabilize the ascorbic acid so as to retain the original physiologic value of the products for an indefinite period.

It is broadly known that the preservation of fruit and vegetables has such an unfavorable influence on the ascorbic acid content that the major part of the acid originally present is destroyed while subsequent storage under unfavorable conditions leads to an almost complete loss of the rest of the ascorbic acid content so that the health of persons who consume such products in absence of any other sources of vitamin C may be seriously impaired. Still more harm for the health may take place if the vitamin content is reduced in medicaments for in such cases the physician relies on the patient receiving an exactly measured dose of the active substance.

Amongst the unfavorable influences leading to decomposition of the ascorbic acid there may be mentioned an ample contact with the atmospheric oxygen which is unavoidable under normal conditions, higher temperatures which accelerate the oxidation, and the presence of certain materials such as enzymes (ferments) and catalysts which also lead to accelerated oxidation. In the vegetable kingdom the ferments known as oxidases occur very frequently. These ferments attack the ascorbic acid, and the most active of them is the so called ascorbinase which contains chemically combined copper. Amongst the simple catalysts which speed up the oxidation of ascorbic acid there are known more particularly the copper compounds, while the compounds of manganese and iron are less active. The copper exerts an effect already if it is present in traces of the order of $10^{-6}$ g.

On the other hand substances are also known which stabilize more or less the ascorbic acid, protecting the same against oxidation also at higher temperatures so that such substances represent in fact negative catalysts. Amongst such substances may be mentioned e. g. the sulphurous acid, hydrogen sulphide, certain mercaptans, the cyanides and iso-cyanides, glutathione, methionine, cysteine, cystine, dimethyl-mercaptal-glucoses, and also highly concentrated solution of saccharose. However, these substances may not be used in the production of foods or in the preparation of medicaments because they either are poisonous or are unsuitable for other reasons or again are not readily available.

In the method of treating natural products as hitherto used the loss of ascorbic acid depends first of all on the period of boiling and further on other circumstances and on other properties of the medium, more particularly on its acidity and finally on the period of storing (ageing) of the preserves. With a boiling period of 15 minutes the content of vitamin C will be reduced in the average to 75% and with a boiling period of 90 minutes it will be reduced down to 15% of the original value. Immediately after the completion of the boiling process a loss of about 50% of the ascorbic acid content in the average is to be expected, but these losses vary within large limits in any particular case.

In highly acid medium (lemon or currant juice) the oxidation of ascorbic acid proceeds at a relatively low speed and also the losses due to ageing are low. The natural acidity of fruit juices, expressed in pH-units, amounts to 4.5-6.5. Due to the ageing of the preserves subsequent to their preparation in the usual way, the ascorbic acid content continuously decreases further so that after 6 to 12 months the ascorbic acid content is reduced in very favorable cases to 20 or 10% of the original value, while in some unfavorable cases the ascorbic acid may completely disappear. Increased temperature, more ample contact with the air and the presence of catalysts impair the ageing characteristics of preserves.

In neutral and especially in alkaline medium the oxidation of the ascorbic acid takes place very rapidly, and this applies also to the loss due to ageing so that within three weeks the ascorbic acid completely disappears from such preserves. The decomposition of ascorbic acid is also accelerated by the presence of copper and iron when making the preserves in copper or iron vessels, because these two metals act as oxidation catalysts.

An object of the present invention is to provide a method of stabilizing and a stabilizer for the ascorbic acid (vitamin C) in natural and artificially prepared products for human food and also in medicaments, various preparations, injection solutions, etc. The new method and stabilizer are suitable in the first place for fruit and vegetables preserved and prepared in any desired manner, for fruit juices, jams, marmalades, compotes, for the preservation of meat, liver, other organs of the animal body and for extracts made therefrom.

As stabilizers there may be used in the first place the various sulfur derivatives of sugars such as e. g. sulpho-ureides of the sugars, thio-acetyl derivatives of the sugars, thio-amino-sugars, etc. The sugar sulpho-ureides are characterized by the group

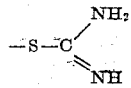

or by the group —N—CS—NH$_2$ which are united to a residue (a radical) of some simple sugar, such as glucose or fructose, e. g. the glucose sulpho-ureide CH$_2$OH(CHOH)$_4$CH=N—CS—NH$_2$. The thio-acetyl derivatives of the sugars contain the group —CSCH$_3$ which occupies the place of hydrogen in one of the hydroxyl groups in the sugar molecule. The thio-amino-sugars are characterized by the terminal group —CSNH$_2$. Other sulphur derivatives of sugar which may be used as stabilizers are more particularly the so called thio-sugars. The expression "thio-sugars" is used to denote such derivatives of the simple or composite sugars (glucose, fructose, maltose) which have at least one reactive oxygen atom in their molecule substituted by a sulphur atom in the group CO or COH. In the case of composite thio-sugars the sulphur atom connects the simple sugar components. Examples of such thio-sugars are the thio-glucose

or, according to more recent findings of research

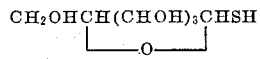

thio-fructose CH$_2$OH(CHOH)$_3$CSCH$_2$OH, thio-maltose C$_{12}$H$_{22}$O$_{10}$S. It is also possible to use the acetylated derivatives of the thio-sugars. Such derivatives are obtained by the acetylation of the OH-groups, that is by substitution of the group COCH$_3$ for hydrogen.

By further investigation of the thio-sugars it has been found that a particularly suitable stabilizer is the diglucosyl disulphide

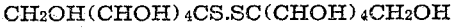

or, according to more recent findings of research

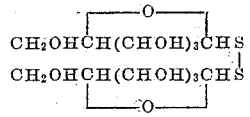

which is obtained as an intermediate product in the preparation of thio-glucose and which by reduction and splitting may be converted to thio-glucose. The diglucosyl disulphide is still more advantageous than the thio-sugars in the stabilization of C-vitamin.

The amount of sulphur sugar derivatives required for the stabilization depends, on the one hand, on the amount of ascorbic acid to be stabilized and, on the other hand, on the concentration of the ascorbic acid in the solution under treatment. A larger amount of ascorbic acid requires a correspondingly larger amount of stabilizer. However, with increasing dilution of the ascorbic acid the required amount of stabilizer increases too, so that the more dilute the solutions of C-vitamin are, the larger is the required proportion of stabilizer.

If thio-sugars are used for the stabilization, an amount of the order of at least 1% calculated on the ascorbic acid present will be required. In connection with diglucosyl disulphide it has been found that a still lower amount is required than with the use of other thio-sugars, an amount of the order of at least 0.4% of the amount of ascorbic acid present being sufficient. The above minimum proportions of stabilizer are valid for at least 1% concentrations of C-vitamin (1 gram of C-vitamin in 100 grams of solution). If the C-vitamin solutions are more diluted, it may be necessary to add relatively larger proportions of stabilizer, so that the addition of stabilizer may reach under certain conditions an amount of the order of the amount of C-vitamin present.

The natural juices and pulps of fruit, vegetables and meat, lemon, orange, currant juice, rose-hip or apricot pulp, contain in fresh condition ascorbic acid in a concentration of 10 mg. to 100 mg. per 100 g. of material. In such cases it is necessary to use the stabilizer in an amount of at least the order of the ascorbic acid present.

The stabilization of ascorbic acid may be improved if the said sulphur sugar derivatives are admixed with alkali metal salts of the pyrophosphoric acid H$_4$P$_2$O$_7$, more particularly with the sodium, potassium or ammonium salts of the latter, e. g. Na$_2$H$_2$P$_2$O$_7$. The said two components are mixed together in amounts of the same order, and the composite stabilizer thus obtained is added to the product in which the ascorbic acid is to be stabilized, in an amount of the order of at least 2%, calculated on the amount of ascorbic acid present. Under certain conditions it is possible, however, to add the said fundamental stabilizing components in an amount up to 100 times larger, i. e. in an amount of the same order as that of the ascorbic acid, without any unfavorable effect on the stabilization of the ascorbic acid or on the taste, flavor, appearance or physiologic activity of the treated product.

The fact that it is possible to overdose the stabilizer without any harmful effect constitutes an advantage in preserving and variously processing fruit and other food products in households where it is not possible to determine exactly the content of C-vitamin in the available raw materials, but only to estimate it by the aid of tables. The amount of C-vitamin, and as a consequence the amount of stabilizer required, is roughly dependent on the volume and weight of the fruit to be treated and on the kind and freshness of the same.

In the stabilization of ascorbic acid it is of importance to produce and maintain constantly a reducing medium, the redoxy-potential having preferably a value within the range of 0.08–0.166 volt; the desired result is secured by choosing suitable proportions for the various components to be mixed.

In carrying out the invention it has been found that in place of the salts of pyro-phosphoric acid, it is possible to make use in the stabilizer of the organic derivatives of this acid, e. g. of the adenosine-triphosphoric acid $C_{10}H_{16}O_{13}N_5P_3$ which contains the following constituents: adenine, ribose, phosphoric acid and pyrophosphoric acid.

The stabilizing effect of thio-sugars and of the other sulphur derivatives of the sugars may be still enhanced by the addition to the stabilizing mixture of secondary amines of the general type $R_1NHR_2$, or amides of the general type $R_1CONHR_2$, where $R_1$ and $R_2$ represent aliphatic or aromatic radicals. The required amount of amines or amides in the stabilizer is of the order of 1% of the amount of thio-sugars or sulphur derivatives of sugars present in the mixture. The effect of these substances resides in the stabilization of the sulphur in the thio-sugars and thus in maintaining the stability of the reducing medium.

It has been found furthermore that for the stabilization of ascorbic acid it is of advantage to keep by means of the stabilizer the acidity of the medium within a certain range which, expressed in pH-units, is comprised between 4.0 and 6.5. The desired effect may be obtained by the addition of pH-regulators which preferably contain free organic poly-carboxylic or hydroxy-poly-carboxylic acids, such as e. g. tartaric or citric acid, and the respective alkali metal salts of the said acids.

The addition of pH-regulators in the stabilization of ascorbic acid is necessary more particularly in connection with artificially prepared products, especially with medicaments which contain synthetic ascorbic acid in approximately neutral solution, furthermore in the preservation of certain sorts of fruit and vegetables (cucumbers, melons), meat, liver and extracts made from the latter and generally in connection with products which give juices of approximately neutral reaction. In such cases it is required to produce by means of the stabilizer a slightly acid medium suitable for the stabilization by adding pH-regulators which maintain the acidity of the medium on a predetermined value. It is not necessary to add pH-regulators to the stabilizer when relatively sour fruit juices or sufficiently sour fruit (lemons, oranges, currants) are being preserved. In such cases the acidity of the medium is maintained by itself within a suitable range for the stabilization and a small addition of a pH-regulator would not have any effect.

The new stabilizers maintain in any medium, natural and artificial, the C-vitamin content and its biological value at an almost invariable degree, even if air is caused to bubble through the material processed in cold condition, or at a higher temperature (lower than the boiling point), or with boiling for a period shorter than 30 minutes. Neither is the C-vitamin content affected by the storage of the stabilized products for a long time, say several months. If the products are boiled for a period longer than 30 minutes, the C-vitamin content is reduced to a relatively small extent only, at most by about 30%. The loss of vitamin depends on the duration of the boiling, the access of atmospheric air and on other unfavorable conditions, e. g. on the presence of catalysts which favor the oxidation of C-vitamin.

Fruit, vegetables, meat etc. boiled or preserved in any of the known methods retain by the effect of the new stabilizer in a slightly acid medium their whole content of ascorbic acid for an indefinite length of time, as it has been proved by numerous tests.

The stabilizer in accordance with the present invention is efficient within a broad range under all conditions which may occur in practice, and moreover the stabilizer may be used with advantage for the stabilization of synthetic ascorbic acid in medical and injection solutions.

Stabilizers for preserving jams or the like of low consistency are prepared preferably with an addition of starch whereby the products are thickened at the same time without boiling them for a long time or thickening them in any other manner, e. g. by means of pectins. The stabilizer for the C-vitamin has at the same time the effect of preserving the boiled products. Moreover the stabilizers may be prepared in such a way that fruit or vegetables of low acidity are acidified by the addition of a pH-regulator, such as citric acid.

The stabilizer in accordance with the present invention is quite harmless to human health and does not affect in the least the flavor and taste of the jams or fine compotes, and in addition the preserves retain their original natural colour. The stabilizer may be used without difficulty in any household and may be stored in suitable powdered form.

*Examples*

1. A stabilizing mixture for 100 liters of natural material (fruit cut to pieces, vegetables, pressed juice) is made by dissolving:

5 g. of thio-glucose,
6 g. of crystalline sodium pyro-phosphate,
35 g. of citric acid,
0.15 g. of acetanilide in 100 g. of water. The solution so obtained is mixed in a suitable mixer with 100 g. of powdered saccharose and with 450 g. of potato starch until a uniformly moist powdered mixture is obtained which is left to dry in the air or is dried artificially at a moderate temperature of 40 to 50 degrees centigrade with agitation. The aforementioned powdered constituents of the stabilizer may be mixed also in dry condition, the sugar and starch being then gradually added to the stabilizing mixture proper under continuous agitation.

6 g. of the stabilizer so prepared in powdered form are used per liter of natural material, and the stabilizer is added preferably to the hot material directly before the latter begins to boil; the mass is then thoroughly and uniformly agitated and the boiling operation is effected in the usual manner for a period as long as necessary. The just mentioned amount of stabilizer is sufficient to stabilize 2.5 g. or more of ascorbic acid in 1 liter of jam or the like and therefore is sufficient for any amount of ascorbic acid which practically may be present in a natural material. The stabilizer has at the same time a protective effect against molds and bacteria so that it is not necessary to add any of the usual preserving agents, or the addition of such agents may be considerably reduced.

The stabilizer thickens (causes to jell) thin juices and jams in the same way as pectin, and preserves fruit and vegetables for a considerable period in the natural colour of the same. In the fruit or vegetables processed in this manner, the original contents of C-vitamin is preserved for an indefinite period and the physiological value of the ready product remains the same as the value of the corresponding fresh fruit.

2. For the stabilization of ascorbic acid in medicaments and similar preparations there is made use of 40 mg. of thio-glucose, 50 mg. of crystalline sodium pyrophosphate and 0.3 mg. of acetanilide per 1 g. of ascorbic acid. The pyro-phosphate may be replaced by an equal amount of adenosine-triphosphoric acid.

3. For injection solutions stored in sealed glass tubes a still lesser amount of stabilizer will be sufficient. There is made use of 5 mg. of a mixture comprising 2.3 mg. of thio-glucose and 2.7 mg. of adenosine-triphosphoric acid per 100 ccm. of injection solution. The injection liquid in a sealed glass tube may be sterilized at 100 degrees centigrade for the usual period of about 20 minutes without any loss of ascorbic acid.

4. In 5 liters of redistilled water there are dissolved in cold condition 500 g. of the sodium salt of the l-ascorbic acid, the hydrogen ion concentration pH is adjusted to 7.0 by the addition of either free ascorbic acid or sodium bicarbonate and 5 g. of thio-glucose are added. The solution is filled into glass tubes, in which it is sterilized by boiling for 20 minutes and then the glass tubes are sealed. The ascorbic acid content in tubes of a capacity of 5 ccm. did not change, as it was proved by polarographic measurements, even after expiration of 6 months of storage of the sealed glass tubes in the usual way.

5. In 5 liters of redistilled water there are dissolved in the cold 500 g. of the sodium salt of l-ascorbic acid, the hydrogen ion concentration pH is adjusted to 7.0 and 2 g. of diglucosyl disulphide are added. The solution so obtained is filled into glass tubes where it is sterilised by boiling for 20 minutes and then the tubes are sealed. The C-vitamin content in the solution did not change, as it was proved by polarographic measurements, even after expiration of six months of storage of the sealed glass tubes in the usual way.

What I claim is:

1. A method of stabilizing the ascorbic acid in naturally occurring and artificially prepared products comprising the step of adding to such products as stabilizers composite thio-sugars composed of two molecules of thio-glucose containing in their molecule two sulfur atoms in substitution for the reactive oxygen atoms in the carbonyl groups in an amount of at least .4% of the amount of ascorbic acid present.

2. A method of stabilizing the ascorbic acid in naturally occurring and artificially prepared products, comprising the step of adding to such products as stabilizers diglucosyl-disulfide in an amount of at least .4% of the amount of ascorbic acid present.

3. A method of stabilizing the ascorbic acid in naturally occurring and artificially prepared products comprising the steps of adding to such products as stabilizers composite thio-sugars composed of two molecules of thio-glucose containing in their molecule two sulfur atoms in substitution for the reactive oxygen atoms and of also adding adenosine-triphosphoric acid for supporting the effect of the stabilizer.

4. A method of stabilizing the ascorbic acid in naturally occurring and artificially prepared products comprising the steps of adding to such products as stabilizers composite thio-sugars composed of two molecules of thio-glucose containing in their molecule two sulfur atoms in substitution for the reactive oxygen atoms and of further adding pH-regulating buffer mixtures containing a free hydroxy-polycarboxylic acid and an alkali metal salt of this acid for supporting the effect of the stabilizer.

5. A stabilizer for ascorbic acid contained in naturally occurring and artificially prepared products comprising composite thio-sugars composed of two molecules of thio-glucose containing in their molecule two sulfur atoms in substitution for the reactive oxygen atoms in the carbonyl group in an amount of at least .4% of the amount of ascorbic acid present.

6. A stabilizer for the ascorbic acid contained in naturally occurring and artificially prepared products comprising diglucosyl disulfide in an amount of at least .4% of the amount of ascorbic acid present.

7. A stabilizer for ascorbic acid contained in natural or artificially prepared products, comprising composite thio-sugars composed of two molecules of thio-glucose containing in their molecule two sulfur atoms in substitution for the reactive oxygen atoms and adenosine-triphosphoric acid.

8. A stabilizer for ascorbic acid contained in natural or artificially prepared products, comprising composite thio-sugars composed of two molecules of thio-glucose containing in their molecule sulfur atoms in substitution for the reactive oxygen atoms and pH-regulating buffer mixtures containing a free hydroxy-polycarboxylic acid and an alkali metal salt of this acid.

JAN OPPLT.

REFERENCES CITED

The following references are of record in the file of this patent:

UNITED STATES PATENTS

| Number | Name | Date |
|---|---|---|
| 2,395,069 | Ruskin | Feb. 19, 1946 |
| 2,427,692 | Ruskin | Sept. 23, 1947 |

OTHER REFERENCES

Rosenberg: "Vitamins," page 327, Interscience, N. Y., 1942.

Advances in Carbohydrate Chemistry, vol. 1, 1945. Edited by Pigman et al., pp. 134–135.